(12) United States Patent
Snyder et al.

(10) Patent No.: US 11,924,756 B2
(45) Date of Patent: *Mar. 5, 2024

(54) NETWORKED EVACUATION SYSTEM

(71) Applicant: OneEvent Technologies, Inc., Mount Horeb, WI (US)

(72) Inventors: Chris Snyder, Blanchardville, WI (US); Kurt Joseph Wedig, Mount Horeb, WI (US); Daniel Ralph Parent, Mount Horeb, WI (US); Anton Vermaak, Mount Horeb, WI (US); Scott Holmstrom, Mount Horeb, WI (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/862,576

(22) Filed: Jul. 12, 2022

(65) Prior Publication Data

US 2023/0021538 A1 Jan. 26, 2023

Related U.S. Application Data

(63) Continuation of application No. 17/086,578, filed on Nov. 2, 2020, now Pat. No. 11,395,227, which is a continuation of application No. 16/364,032, filed on Mar. 25, 2019, now Pat. No. 10,849,067, which is a continuation of application No. 15/468,532, filed on Mar. 24, 2017, now Pat. No. 10,244,474, which is a continuation of application No. 14/209,472, filed on Mar. 13, 2014, now Pat. No. 9,609,594.

(60) Provisional application No. 61/789,084, filed on Mar. 15, 2013.

(51) Int. Cl.
*H04W 52/02* (2009.01)

(52) U.S. Cl.
CPC .... *H04W 52/0216* (2013.01); *H04W 52/0277* (2013.01); *Y02D 30/70* (2020.08)

(58) Field of Classification Search
CPC ......... H04W 4/90; H04W 84/18; H04W 4/38; H04L 67/12
See application file for complete search history.

(56) References Cited

U.S. PATENT DOCUMENTS

| | | | |
|---|---|---|---|
| 8,913,598 B2 | 12/2014 | Thoukydides et al. | |
| 9,380,622 B2 | 6/2016 | Polisetty | |
| 9,860,129 B2 | 1/2018 | Zinger | |
| 2010/0290509 A1 | 11/2010 | Dalsgaard et al. | |
| 2011/0032114 A1 | 2/2011 | Egawa et al. | |
| 2011/0298598 A1 | 12/2011 | Rhee | |
| 2011/0299423 A1 | 12/2011 | Shim et al. | |
| 2012/0163352 A1 | 6/2012 | Bansal et al. | |
| 2013/0155929 A1 | 6/2013 | Aboul-Magd et al. | |
| 2014/0029567 A1 | 1/2014 | Grady | |
| 2017/0270481 A1* | 9/2017 | Morgenthau | H04W 4/80 |

* cited by examiner

*Primary Examiner* — Shukri Taha
(74) *Attorney, Agent, or Firm* — Kenneth A. Smith

(57) ABSTRACT

A method includes determining, by a sensor node in communication with a communication network, an evacuation condition, retrieving by a decision node, occupancy information pertaining to an area, retrieving area data, and determining an evacuation route, at least in part using the evacuation condition, occupancy information, and area data, and communicating the determined evacuation route to area occupants.

20 Claims, 4 Drawing Sheets

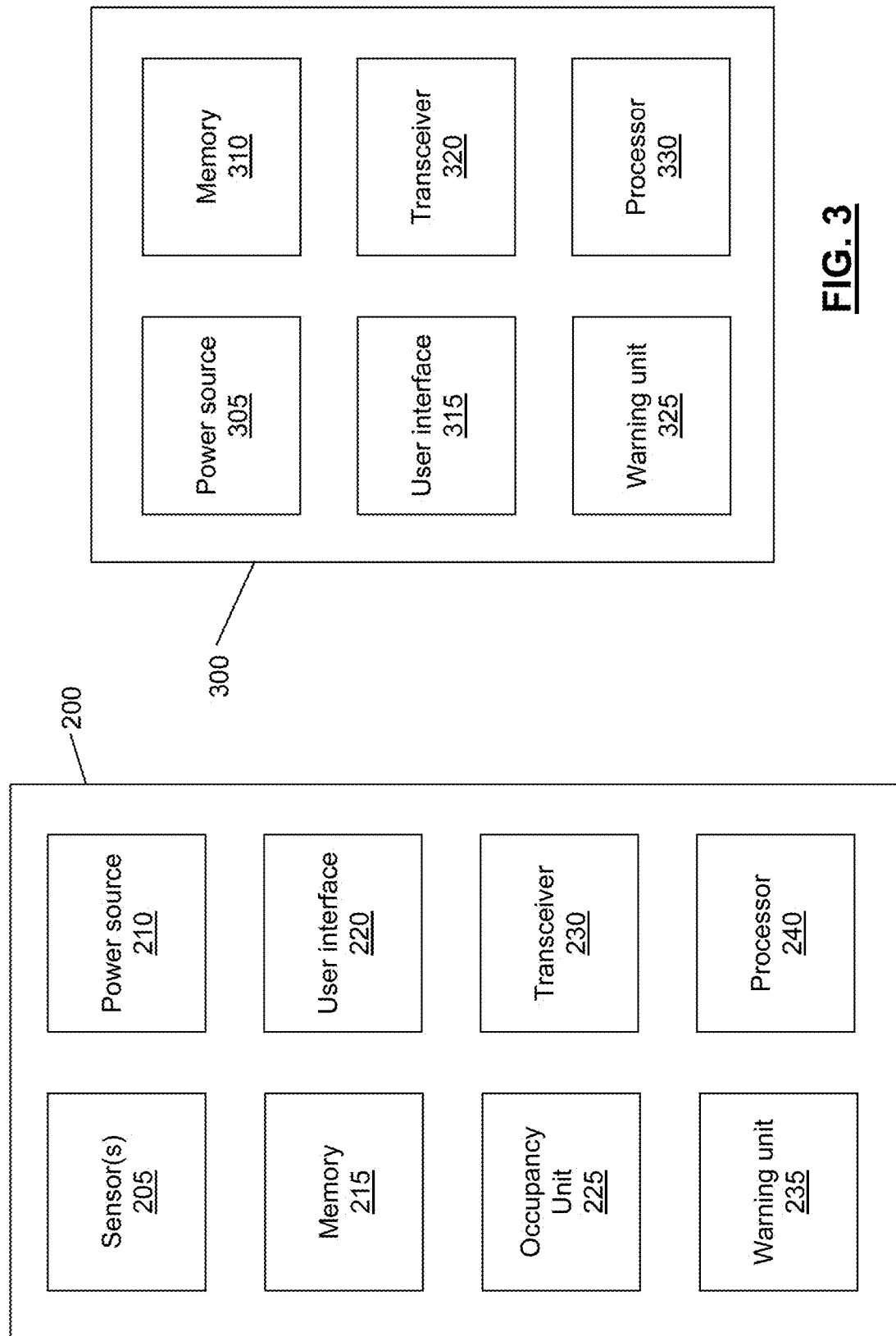

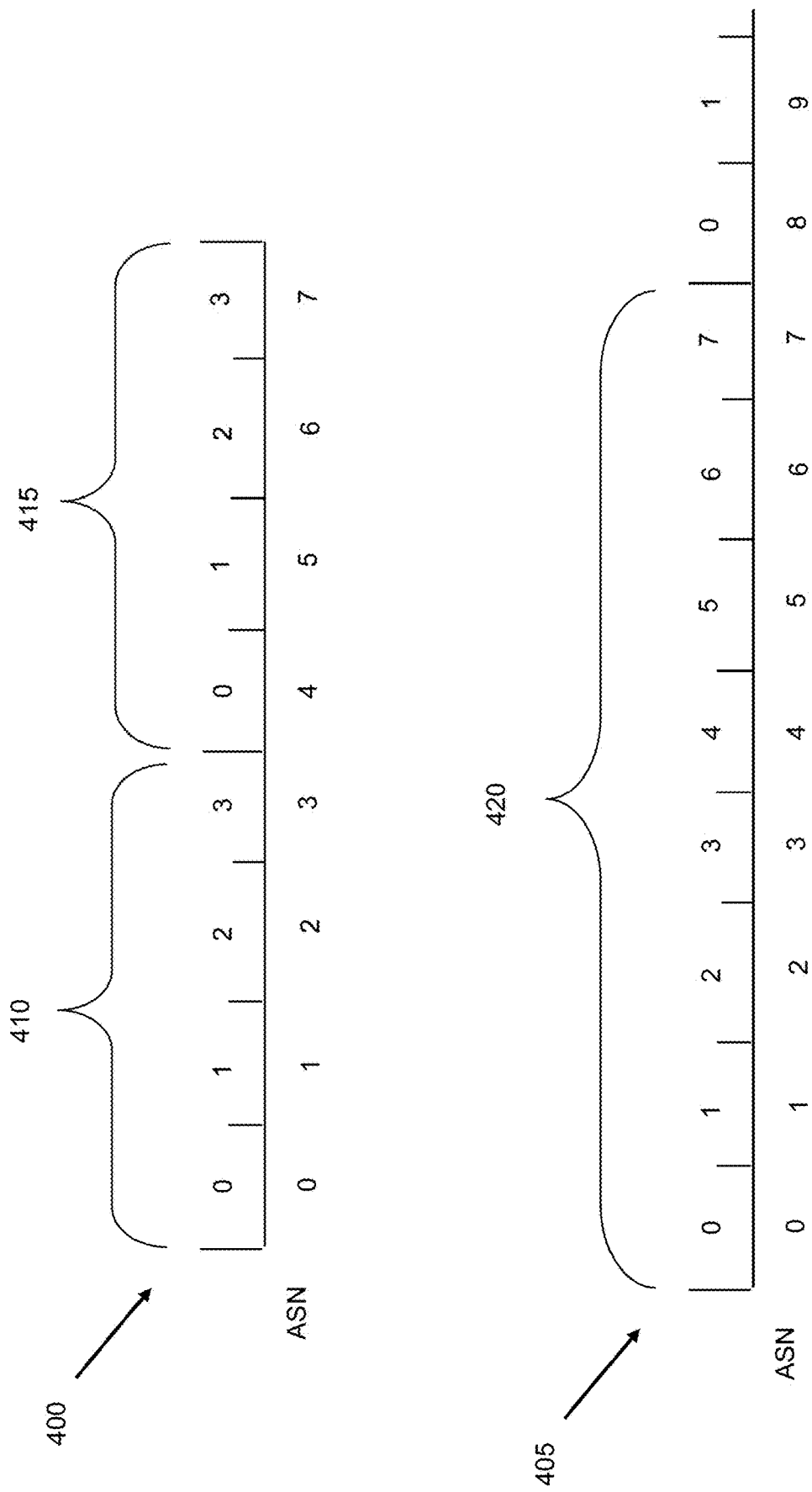

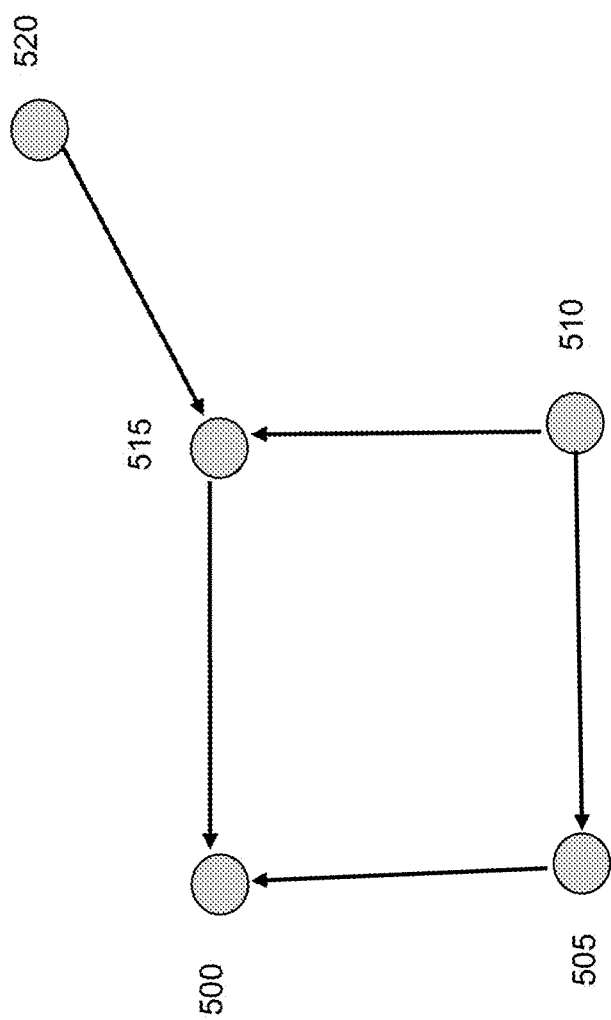

NETWORKED EVACUATION SYSTEM

CROSS REFERENCE TO RELATED APPLICATIONS

The present application is a continuation of U.S. application Ser. No. 17/086,578 filed Nov. 2, 2020, which is a continuation of U.S. application Ser. No. 16/364,032, filed Jan. 28, 2019 (Now U.S. Pat. No. 10,849,067), which is a continuation of U.S. application Ser. No. 15/468,532, filed Mar. 24, 2017 (now U.S. Pat. No. 10,244,474), which is a continuation of U.S. application Ser. No. 14/209,472, filed Mar. 13, 2014 (now U.S. Pat. No. 9,609,594), which claims priority to U.S. Provisional App. No. 61/789,084 filed on Mar. 15, 2013, the entire disclosures of which are hereby incorporated by reference herein.

BACKGROUND

Most homes, office buildings, stores, etc. are equipped with one or more smoke detectors. In the event of a fire, the smoke detectors are configured to detect smoke and sound an alarm. The alarm, which is generally a series of loud beeps or buzzes, is intended to alert individuals of the fire such that the individuals can evacuate the building. Unfortunately, with the use of smoke detectors, there are still many casualties every year caused by building fires and other hazardous conditions. Confusion in the face of an emergency, poor visibility, unfamiliarity with the building, etc. can all contribute to the inability of individuals to effectively evacuate a building. Further, in a smoke detector equipped building with multiple exits, individuals have no way of knowing which exit is safest in the event of a fire or other evacuation condition. As such, the inventors have perceived an intelligent evacuation system with multiple nodes that are in communication with one another and external devices to help individuals successfully evacuate a building in the event of an evacuation condition.

SUMMARY

An illustrative method includes determining, by a first node in a communication network, a listening schedule to be used by the first node. The listening schedule is based at least in part on a battery life of the first node. The method also includes transmitting, by the first node, the listening schedule to a second node in the communication network such that the second node is able to communicate with the first node in accordance with the listening schedule.

An illustrative first node includes a memory, a processor operatively coupled to the memory, and a transmitter operatively coupled to the processor. The processor is configured to determine a listening schedule to be used by the first node. The listening schedule is based at least in part on a battery life of the first node. The transmitter is configured to transmit the listening schedule to a second node in the communication network such that the second node is able to communicate with the first node in accordance with the listening schedule.

An illustrative non-transitory computer-readable medium has computer-readable instructions stored thereon for execution by a first node in a communication network. The instructions include instructions to determine a listening schedule to be used by the first node, where the listening schedule is based at least in part on a battery life of the first node. The instructions also include instructions to transmit the listening schedule to a second node in the communication network such that the second node is able to communicate with the first node in accordance with the listening schedule.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

FIG. 2 is a block diagram illustrating a sensory node in accordance with an illustrative embodiment.

FIG. 3 is a block diagram illustrating a decision node in accordance with an illustrative embodiment.

FIG. 4 illustrates a schedule of a first node and a schedule of a second node in accordance with an illustrative embodiment.

FIG. 5 illustrates a node edge diagram in accordance with an illustrative embodiment.

DETAILED DESCRIPTION

Figure 1:
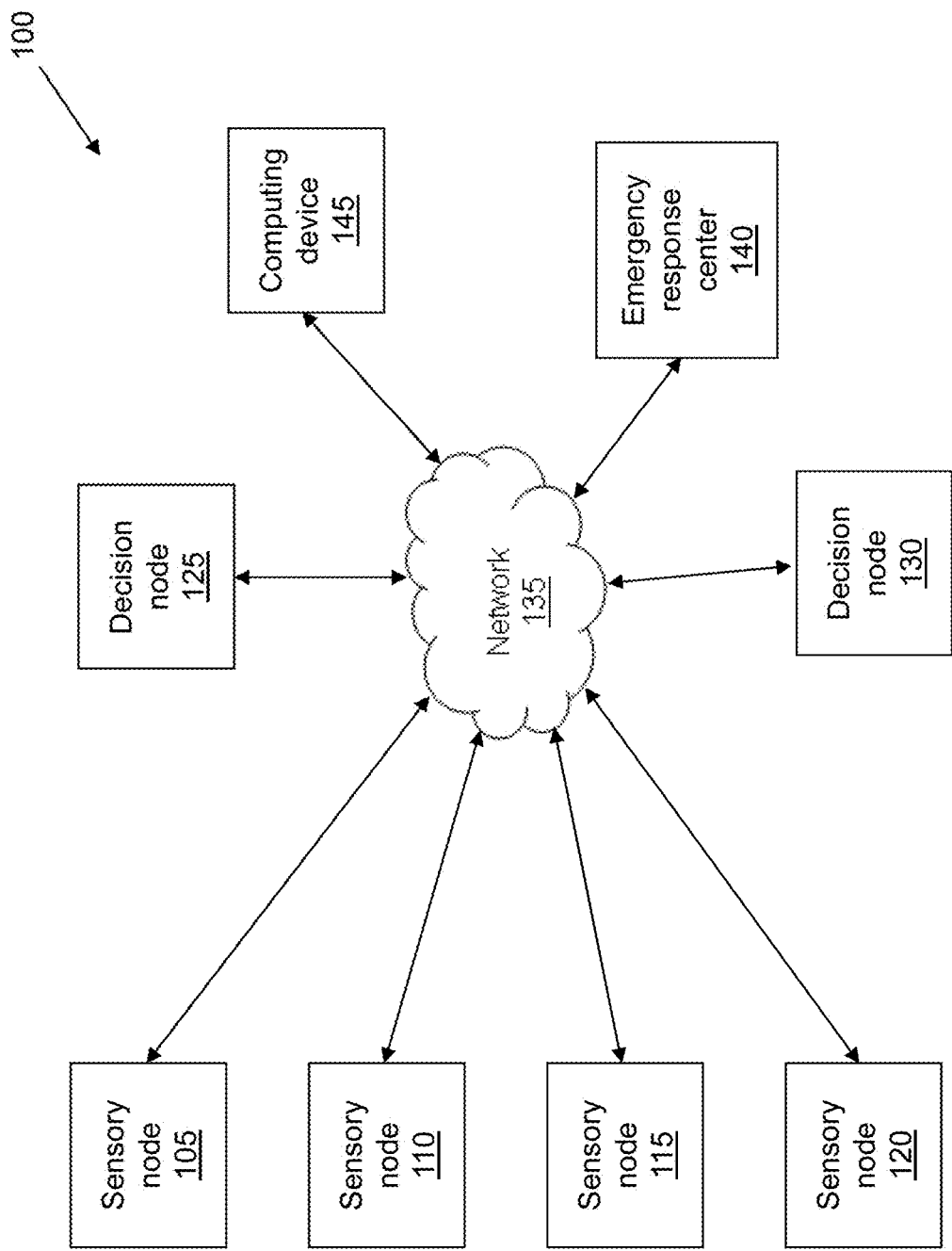
FIG. 1 is a block diagram illustrating an evacuation system in accordance with an illustrative embodiment.

Described herein is an illustrative communication system for use in an evacuation system that includes multiple nodes in communication with one another. The evacuation system can assist individuals with evacuation from a structure during an evacuation condition. An illustrative evacuation system can include one or more sensory nodes configured to detect and/or monitor occupancy and to detect the evacuation condition. Based on the type of evacuation condition, the magnitude (or severity) of the evacuation condition, the location of the sensory node which detected the evacuation condition, the occupancy information, and/or other factors, the evacuation system can determine one or more evacuation routes such that individuals are able to safely evacuate the structure. The evacuation system can also contact an emergency response center in response to the evacuation condition.

FIG. 1 is a block diagram of an evacuation system 100 in accordance with an illustrative embodiment. In alternative embodiments, evacuation system 100 may include additional, fewer, and/or different components. Evacuation system 100 includes a sensory node 105, a sensory node 110, a sensory node 115, and a sensory node 120. In alternative embodiments, additional or fewer sensory nodes may be included. Evacuation system 100 also includes a decision node 125 and a decision node 130. Alternatively, additional or fewer decision nodes may be included.

In an illustrative embodiment, sensory nodes 105, 110, 115, and 120 can be configured to detect an evacuation condition. The evacuation condition can be a fire, which may be detected by the presence of smoke and/or excessive heat. The evacuation condition may also be an unacceptable level of a toxic gas such as carbon monoxide, nitrogen dioxide, etc. Sensory nodes 105, 110, 115, and 120 can be distributed throughout a structure. The structure can be a home, an office building, a commercial space, a store, a factory, or any other building or structure. As an example, a single story office building can have one or more sensory nodes in each office, each bathroom, each common area, etc. An illustrative sensory node is described in more detail with reference to FIG. 2.

Sensory nodes 105, 110, 115, and 120 can also be configured to detect and/or monitor occupancy such that evacuation system 100 can determine one or more optimal evacuation routes. For example, sensory node 105 may be placed in a conference room of a hotel. Using occupancy detection, sensory node 105 can know that there are approximately 80 individuals in the conference room at the time of an evacuation condition. Evacuation system 100 can use this occupancy information (i.e., the number of individuals and/or the location of the individuals) to determine the evacuation route(s). For example, evacuation system 100 may attempt to determine at least two safe evacuation routes from the conference room to avoid congestion that may occur if only a single evacuation route is designated. Occupancy detection and monitoring are described in more detail with reference to FIG. 2.

Decision nodes 125 and 130 can be configured to determine one or more evacuation routes upon detection of an evacuation condition. Decision nodes 125 and 130 can determine the one or more evacuation routes based on occupancy information such as a present occupancy or an occupancy pattern of a given area, the type of evacuation condition, the magnitude of the evacuation condition, the location(s) at which the evacuation condition is detected, the layout of the structure, etc. The occupancy pattern can be learned over time as the nodes monitor areas during quiescent conditions. Upon determination of the one or more evacuation routes, decision nodes 125 and 130 and/or sensory nodes 105, 110, 115, and 120 can convey the evacuation route(s) to the individuals in the structure. In an illustrative embodiment, the evacuation route(s) can be conveyed as audible voice evacuation messages through speakers of decision nodes 125 and 130 and/or sensory nodes 105, 110, 115, and 120. Alternatively, the evacuation route(s) can be conveyed by any other method. An illustrative decision node is described in more detail with reference to FIG. 3.

Sensory nodes 105, 110, 115, and 120 can communicate with decision nodes 125 and 130 through a network 135. Network 135 can be a distributed intelligent network such that evacuation system 100 can make decisions based on sensory input from any nodes in the population of nodes. In an illustrative embodiment, decision nodes 125 and 130 can communicate with sensory nodes 105, 110, 115, and 120 through a short-range or other communication network. Decision nodes 125 and 130 can also communicate with an emergency response center 140 through a telecommunications network, the Internet, a PSTN, etc. As such, in the event of an evacuation condition, emergency response center 140 can be automatically notified. Emergency response center 140 can be a 911 call center, a fire department, a police department, etc.

In the event of an evacuation condition, a sensory node that detected the evacuation condition can provide an indication of the evacuation condition to decision node 125 and/or decision node 130. The indication can include an identification and/or location of the sensory node, a type of the evacuation condition, and/or a magnitude of the evacuation condition. The magnitude of the evacuation condition can include an amount of smoke generated by a fire, an amount of heat generated by a fire, an amount of toxic gas in the air, etc. The indication of the evacuation condition can be used by decision node 125 and/or decision node 130 to determine evacuation routes.

In an illustrative embodiment, sensory nodes 105, 110, 115, and 120 can also periodically provide status information to decision node 125 and/or decision node 130. The status information can include an identification of the sensory node, location information corresponding to the sensory node, information regarding battery life, and/or information regarding whether the sensory node is functioning properly. As such, decision nodes 125 and 130 can be used as a diagnostic tool to alert a system administrator or other user of any problems with sensory nodes 105, 110, 115, and 120. Decision nodes 125 and 130 can also communicate status information to one another for diagnostic purposes. The system administrator can also be alerted if any of the nodes of evacuation system 100 fail to timely provide status information according to a periodic schedule. In one embodiment, a detected failure or problem within evacuation system 100 can be communicated to the system administrator or other user via a text message or an e-mail.

In an illustrative embodiment, each of sensory nodes 105, 110, 115, and 120 and/or each of decision nodes 125 and 130 can know its location. The location can be global positioning system (GPS) coordinates. In one embodiment, a computing device 145 can be used to upload the location to sensory nodes 105, 110, 115, and 120 and/or decision nodes 125 and 130. Computing device 145 can be a portable GPS system, a cellular device, a laptop computer, or any other type of communication device configured to convey the location. As an example, computing device 145 can be a GPS-enabled laptop computer. During setup and installation of evacuation system 100, a technician can place the GPS-enabled laptop computer proximate to sensory node 105. The GPS-enabled laptop computer can determine its current GPS coordinates, and the GPS coordinates can be uploaded to sensory node 105. The GPS coordinates can be uploaded to sensory node 105 wirelessly through network 135 or through a wired connection. Alternatively, the GPS coordinates can be manually entered through a user interface of sensory node 105. The GPS coordinates can similarly be uploaded to sensory nodes 110, 115, and 120 and decision nodes 125 and 130. In one embodiment, sensory nodes 105, 110, 115, and 120 and/or decision nodes 125 and 130 may be GPS-enabled for determining their respective locations. In one embodiment, each node can have a unique identification number or tag, which may be programmed during the manufacturing of the node. The identification can be used to match the GPS coordinates to the node during installation. Computing device 145 can use the identification information to obtain a one-to-one connection with the node to correctly program the GPS coordinates over network 135. In an alternative embodiment, GPS coordinates may not be used, and the location can be in terms of position with a particular structure. For example, sensory node 105 may be located in room five on the third floor of a hotel, and this information can be the location information for sensory node 105. Regardless of how the locations are represented, evacuation system 100 can determine the evacuation route(s) based at least in part on the locations and a known layout of the structure.

In one embodiment, a zeroing and calibration method may be employed to improve the accuracy of the indoor GPS positioning information programmed into the nodes during installation. Inaccuracies in GPS coordinates can occur due to changes in the atmosphere, signal delay, the number of viewable satellites, etc., and the expected accuracy of GPS is usually about 6 meters. To calibrate the nodes and improve location accuracy, a relative coordinated distance between nodes can be recorded as opposed to a direct GPS coordinate. Further improvements can be made by averaging multiple GPS location coordinates at each perspective node over a given period (i.e., 5 minutes, etc.) during evacuation system 100 configuration. At least one node can be designated as a zeroing coordinate location. All other measurements can be made with respect to the zeroing coordinate location. In one embodiment, the accuracy of GPS coordinates can further be improved by using an enhanced GPS location band such as the military P(Y) GPS location band. Alternatively, any other GPS location band may be used.

FIG. 2 is a block diagram illustrating a sensory node 200 in accordance with an illustrative embodiment. In alternative embodiments, sensory node 200 may include additional, fewer, and/or different components. Sensory node 200 includes sensor(s) 205, a power source 210, a memory 215, a user interface 220, an occupancy unit 225, a transceiver 230, a warning unit 235, and a processor 240. Sensor(s) 205 can include a smoke detector, a heat sensor, a carbon monoxide sensor, a nitrogen dioxide sensor, and/or any other type of hazardous condition sensor known to those of skill in the art. In an illustrative embodiment, power source 210 can be a battery. Sensory node 200 can also be hard-wired to the structure such that power is received from the power supply of the structure (i.e., utility grid, generator, solar cell, fuel cell, etc.). In such an embodiment, power source 210 can also include a battery for backup during power outages.

Memory 215 can be configured to store identification information corresponding to sensory node 200. The identification information can be any indication through which other sensory nodes and decision nodes are able to identify sensory node 200. Memory 215 can also be used to store location information corresponding to sensory node 200. The location information can include global positioning system (GPS) coordinates, position within a structure, or any other information which can be used by other sensory nodes and/or decision nodes to determine the location of sensory node 200. In one embodiment, the location information may be used as the identification information. The location information can be received from computing device 145 described with reference to FIG. 1, or from any other source. Memory 215 can further be used to store routing information for a mesh network in which sensory node 200 is located such that sensory node 200 is able to forward information to appropriate nodes during normal operation and in the event of one or more malfunctioning nodes. Memory 215 can also be used to store occupancy information and/or one or more evacuation messages to be conveyed in the event of an evacuation condition. Memory 215 can further be used for storing adaptive occupancy pattern recognition algorithms and for storing compiled occupancy patterns.

User interface 220 can be used by a system administrator or other user to program and/or test sensory node 200. User interface 220 can include one or more controls, a liquid crystal display (LCD) or other display for conveying information, one or more speakers for conveying information, etc. In one embodiment, a user can utilize user interface 220 to record an evacuation message to be played back in the event of an evacuation condition. As an example, sensory node 200 can be located in a bedroom of a small child. A parent of the child can record an evacuation message for the child in a calm, soothing voice such that the child does not panic in the event of an evacuation condition. An example evacuation message can be "wake up Kristin, there is a fire, go out the back door and meet us in the back yard as we have practiced." Different evacuation messages may be recorded for different evacuation conditions. Different evacuation messages may also be recorded based on factors such as the location at which the evacuation condition is detected. As an example, if a fire is detected by any of sensory nodes one through six, a first pre-recorded evacuation message can be played (i.e., exit through the back door), and if the fire is detected at any of nodes seven through twelve, a second pre-recorded evacuation message can be played (i.e., exit through the front door). User interface 220 can also be used to upload location information to sensory node 200, to test sensory node 200 to ensure that sensory node 200 is functional, to adjust a volume level of sensory node 200, to silence sensory node 200, etc. User interface 220 can also be used to alert a user of a problem with sensory node 200 such as low battery power or a malfunction. In one embodiment, user interface 220 can be used to record a personalized message in the event of low battery power, battery malfunction, or other problem. For example, if the device is located within a home structure, the pre-recorded message may indicate that "the evacuation detector in the hallway has low battery power, please change." User interface 220 can further include a button such that a user can report an evacuation condition and activate the evacuation system.

Occupancy unit 225 can be used to detect and/or monitor occupancy of a structure. As an example, occupancy unit 225 can detect whether one or more individuals are in a given room or area of a structure. A decision node can use this occupancy information to determine an appropriate evacuation route or routes. As an example, if it is known that two individuals are in a given room, a single evacuation route can be used. However, if three hundred individuals are in the room, multiple evacuation routes may be provided to prevent congestion. Occupancy unit 225 can also be used to monitor occupancy patterns. As an example, occupancy unit 225 can determine that there are generally numerous individuals in a given room or location between the hours of 8:00 am and 6:00 pm on Mondays through Fridays, and that there are few or no individuals present at other times. A decision node can use this information to determine appropriate evacuation route(s). Information determined by occupancy unit 225 can also be used to help emergency responders in responding to the evacuation condition. For example, it may be known that one individual is in a given room of the structure. The emergency responders can use this occupancy information to focus their efforts on getting the individual out of the room. The occupancy information can be provided to an emergency response center along with a location and type of the evacuation condition. Occupancy unit 225 can also be used to help sort rescue priorities based at least in part on the occupancy information while emergency responders are on route to the structure.

Occupancy unit 225 can detect/monitor the occupancy using one or more motion detectors to detect movement. Occupancy unit 225 can also use a video or still camera and video/image analysis to determine the occupancy. Occupancy unit 225 can also use respiration detection by detecting carbon dioxide gas emitted as a result of breathing. An example high sensitivity carbon dioxide detector for use in respiration detection can be the MG-811 CO2 sensor manufactured by Henan Hanwei Electronics Co., Ltd. based in Zhengzhou, China. Alternatively, any other high sensitivity carbon dioxide sensor may be used. Occupancy unit 225 can also be configured to detect methane, or any other gas which may be associated with human presence.

Occupancy unit 225 can also use infrared sensors to detect heat emitted by individuals. In one embodiment, a plurality of infrared sensors can be used to provide multidirectional monitoring. Alternatively, a single infrared sensor can be used to scan an entire area. The infrared sensor(s) can be combined with a thermal imaging unit to identify thermal patterns and to determine whether detected occupants are human, feline, canine, rodent, etc. The infrared sensors can also be used to determine if occupants are moving or still, to track the direction of occupant traffic, to track the speed of occupant traffic, to track the volume of occupant traffic, etc. This information can be used to alert emergency responders to a panic situation, or to a large captive body of individuals. Activities occurring prior to an evacuation condition can be sensed by the infrared sensors and recorded by the evacuation system. As such, suspicious behavioral movements occurring prior to an evacuation condition can be sensed and recorded. For example, if the evacuation condition was maliciously caused, the recorded information from the infrared sensors can be used to determine how quickly the area was vacated immediately prior to the evacuation condition. Infrared sensor based occupancy detection is described in more detail in an article titled "Development of Infrared Human Sensor" in the Matsushita Electric Works (MEW) Sustainability Report 2004, the entire disclosure of which is incorporated herein by reference.

Occupancy unit 225 can also use audio detection to identify noises associated with occupants such as snoring, respiration, heartbeat, voices, etc. The audio detection can be implemented using a high sensitivity microphone which is capable of detecting a heartbeat, respiration, etc. from across a room. Any high sensitivity microphone known to those of skill in the art may be used. Upon detection of a sound, occupancy unit 225 can utilize pattern recognition to identify the sound as speech, a heartbeat, respiration, snoring, etc. Occupancy unit 225 can similarly utilize voice recognition and/or pitch tone recognition to distinguish human and non-human occupants and/or to distinguish between different human occupants. As such, emergency responders can be informed whether an occupant is a baby, a small child, an adult, a dog, etc. Occupancy unit 225 can also detect occupants using scent detection. An example sensor for detecting scent is described in an article by Jacqueline Mitchell titled "Picking Up the Scent" and appearing in the August 2008 Tufts Journal, the entire disclosure of which is incorporated herein by reference.

In one embodiment, occupancy unit 225 can also be implemented as a portable, handheld occupancy unit. The portable occupancy unit can be configured to detect human presence using audible sound detection, infrared detection, respiration detection, motion detection, scent detection, etc. as described above. Firefighters, paramedics, police, etc. can utilize the portable occupancy unit to determine whether any human is present in a room with limited or no visibility. As such, the emergency responders can quickly scan rooms and other areas without expending the time to fully enter the room and perform an exhaustive manual search. The portable occupancy unit can include one or more sensors for detecting human presence. The portable occupancy unit can also include a processor for processing detected signals as described above with reference to occupancy unit 225, a memory for data storage, a user interface for receiving user inputs, an output for conveying whether human presence is detected, etc.

In an alternative embodiment, sensory node 200 (and/or decision node 300 described with reference to FIG. 3) can be configured to broadcast occupancy information. In such an embodiment, emergency response personnel can be equipped with a portable receiver configured to receive the broadcasted occupancy information such that the responder knows where any humans are located with the structure. The occupancy information can also be broadcast to any other type of receiver. The occupancy information can be used to help rescue individuals in the event of a fire or other evacuation condition. The occupancy information can also be used in the event of a kidnapping or hostage situation to identify the number of victims involved, the number of perpetrators involved, the locations of the victims and/or perpetrators, etc.

Transceiver 230 can include a transmitter for transmitting information and/or a receiver for receiving information. As an example, transceiver 230 of sensory node 200 can receive status information, occupancy information, evacuation condition information, etc. from a first sensory node and forward the information to a second sensory node or to a decision node. Transceiver 230 can also be used to transmit information corresponding to sensory node 200 to another sensory node or a decision node. For example, transceiver 230 can periodically transmit occupancy information to a decision node such that the decision node has the occupancy information in the event of an evacuation condition. Alternatively, transceiver 230 can be used to transmit the occupancy information to the decision node along with an indication of the evacuation condition. Transceiver 230 can also be used to receive instructions regarding appropriate evacuation routes and/or the evacuation routes from a decision node. Alternatively, the evacuation routes can be stored in memory 215 and transceiver 230 may only receive an indication of which evacuation route to convey.

Warning unit 235 can include a speaker and/or a display for conveying an evacuation route or routes. The speaker can be used to play an audible voice evacuation message. The evacuation message can be conveyed in one or multiple languages, depending on the embodiment. If multiple evacuation routes are used based on occupancy information or the fact that numerous safe evacuation routes exist, the evacuation message can include the multiple evacuation routes in the alternative. For example, the evacuation message may state "please exit to the left through stairwell A, or to the right through stairwell B." The display of warning unit 235 can be used to convey the evacuation message in textual form for deaf individuals or individuals with poor hearing. Warning unit 235 can further include one or more lights to indicate that an evacuation condition has been detected and/or to illuminate at least a portion of an evacuation route. In the event of an evacuation condition, warning unit 235 can be configured to repeat the evacuation message(s) until a stop evacuation message instruction is received from a decision node, until the evacuation system is reset or muted by a system administrator or other user, or until sensory node 200 malfunctions due to excessive heat, etc. Warning unit 235 can also be used to convey a status message such as "smoke detected in room thirty-five on the third floor." The status message can be played one or more times in between the evacuation message. In an alternative embodiment, sensory node 200 may not include warning unit 235, and the evacuation route(s) may be conveyed only by decision nodes. The evacuation condition may be detected by sensory node 200, or by any other node in direct or indirect communication with sensory node 200.

Processor 240 can be operatively coupled to each of the components of sensory node 200, and can be configured to control interaction between the components. For example, if an evacuation condition is detected by sensor(s) 205, processor 240 can cause transceiver 230 to transmit an indication of the evacuation condition to a decision node. In response, transceiver 230 can receive an instruction from the decision node regarding an appropriate evacuation message to convey. Processor 240 can interpret the instruction, obtain the appropriate evacuation message from memory 215, and cause warning unit 235 to convey the obtained evacuation message. Processor 240 can also receive inputs from user interface 220 and take appropriate action. Processor 240 can further be used to process, store, and/or transmit occupancy information obtained through occupancy unit 225. Processor 240 can further be coupled to power source 210 and used to detect and indicate a power failure or low battery condition. In one embodiment, processor 240 can also receive manually generated alarm inputs from a user through user interface 220. As an example, if a fire is accidently started in a room of a structure, a user may press an alarm activation button on user interface 220, thereby signaling an evacuation condition and activating warning unit 235. In such an embodiment, in the case of accidental alarm activation, sensory node 200 may inform the user that he/she can press the alarm activation button a second time to disable the alarm. After a predetermined period of time (i.e., 5 seconds, 10 seconds, 30 seconds, etc.), the evacuation condition may be conveyed to other nodes and/or an emergency response center through the network.

FIG. 3 is a block diagram illustrating a decision node 300 in accordance with an exemplary embodiment. In alternative embodiments, decision node 300 may include additional, fewer, and/or different components. Decision node 300 includes a power source 305, a memory 310, a user interface 315, a transceiver 320, a warning unit 325, and a processor 330. In one embodiment, decision node 300 can also include sensor(s) and/or an occupancy unit as described with reference to sensory unit 200 of FIG. 2. In an illustrative embodiment, power source 305 can be the same or similar to power source 210 described with reference to FIG. 2. Similarly, user interface 315 can be the same or similar to user interface 220 described with reference to FIG. 2, and warning unit 325 can be the same or similar to warning unit 235 described with reference to FIG. 2.

Memory 310 can be configured to store a layout of the structure(s) in which the evacuation system is located, information regarding the locations of sensory nodes and other decision nodes, information regarding how to contact an emergency response center, occupancy information, occupancy detection and monitoring algorithms, and/or an algorithm for determining an appropriate evacuation route. Transceiver 320, which can be similar to transceiver 230 described with reference to FIG. 2, can be configured to receive information from sensory nodes and other decision nodes and to transmit evacuation routes to sensory nodes and/or other decision nodes. Processor 330 can be operatively coupled to each of the components of decision node 300, and can be configured to control interaction between the components.

In one embodiment, decision node 300 can be an exit sign including an EXIT display in addition to the components described with reference to FIG. 3. As such, decision node 300 can be located proximate an exit of a structure, and warning unit 325 can direct individuals toward or away from the exit depending on the identified evacuation route(s). In an alternative embodiment, all nodes of the evacuation system may be identical such that there is not a distinction between sensory nodes and decision nodes. In such an embodiment, all of the nodes can have sensor(s), an occupancy unit, decision-making capability, etc.

In an illustrative embodiment, the nodes described herein can form a network and can communicate with one another through the network. As known to those of skill in the art, nodes in a network often operate on a schedule in which the node is asleep for a portion of the time and awake for a portion of the time. When the node is asleep, the node is not listening for communications from other nodes and therefore does not receive communications. The sleep mode is often used to conserve power in battery powered nodes. In the awake condition, the node listens for any communications that are directed to the node and is therefore able to receive communications when the node is in the awake state. However, traditional scheduling algorithms are complicated and storing the schedules themselves requires a large amount of data.

In an illustrative embodiment, each node in the network described herein can establish its own schedule for when the node wakes up to listen for communications from other nodes. A frequency with which the node wakes up is decided by the node and can be based at least in part on a desired or expected battery life of the node. For example, if the battery life of the node is expected to be two years, the node can select a wake up frequency that will allow the node's battery to last 2 years. The determination of how often to wake up can take into consideration factors such as existing battery life, desired/expected life of the battery, amount of time until the desired/expected life of the battery is reached, etc. The node can also adjust its schedule as time goes on to help ensure that the desired/expected battery life is achieved.

In another illustrative embodiment, the schedule of the node is in terms of a frame composed of one or more time slots (or slots), and a node can be awake for one slot during each frame. The node itself defines the frame length in terms of a number of slots that are to compose a frame for that node. Each node can have a schedule that is based on a different frame length. For example, a first node can determine, based on its desired/expected battery life, etc., that a frame length for that node should be 4 slots. As such, the first node will be awake for 1 slot during each frame, or 1 out of every 4 slots. A second node can determine, based on its desired/expected battery life, etc., that a frame length for that node should be 8 slots. As such, the second node will be awake for 1slot during each frame, or 1 out of every 8 slots. In an illustrative embodiment, each node in the network may be required to select a frame length that is a multiple of 2 (i.e., a frame length of 2 slots, 4 slots, 8 slots, 16 slots, 32 slots, etc.). The use of multiples of 2 for the frame length can reduce the complexity of the schedule and allow the schedule to be conveyed with a small number of bytes using the modulus. In an alternative embodiment, the schedule may include frame lengths that are not a multiple of 2.

In one embodiment, each slot may have an absolute slot number, which is essentially a count of the number of slots that have occurred since the network originated. A first slot can have an absolute slot number of zero, the second slot can have an absolute slot number of 1, the one hundredth slot can have an absolute slot number of 99, etc. FIG. 4 illustrates a schedule 400 of a first node and a schedule 405 of a second node in accordance with an illustrative embodiment. The first node has a frame length of 4, and two full frames (i.e., frame 410 and frame 415) are illustrated for schedule 400. The second node has a frame length of 8. One full frame 420 and a partial frame are illustrated for the second node. The absolute slot number (ASN) is illustrated under each of the schedule diagrams. The slots are also numbered within each frame.

In an illustrative embodiment, each node distributes its schedule such that all neighboring nodes have each other's schedule. Alternatively, all nodes in the network may have the schedule of all other nodes in the network. In an embodiment in which frame sizes for each node are a multiple of 2, the schedule can have a small size such as 4 bytes. As such, the schedule can be distributed without consuming much bandwidth in the network. Distribution is discussed in more detail below.

In one embodiment in which a large amount of data is to be distributed by a single node, the single node may force another node to at least temporarily use a dedicated schedule. The single node can provide the dedicated schedule to the other node and the other node can adopt the schedule and receive information from the single node in accordance with the dedicated schedule. In such an embodiment, the dedicated schedule may expire after a given number of slots. Upon expiration of the dedicated schedule, the other node may revert back to the schedule of its choosing.

Because slots are essentially units of time during which a given node may be listening for transmissions, it is important that all nodes be synchronized with one another such that the slot corresponding to a given absolute slot number is the same time period for all nodes. Traditional networks operate with a root node that maintains network timing for all nodes in the network. In such a traditional network, timing is propagated outward from the root. The timing signal can be, but is not necessarily a broadcast signal. In some traditional networks, to stay in sync, a node may communicate regularly (unicast or otherwise) with a node closer to the root than itself. This creates a situation in which the timing drift gets worse as you go farther from the root node. In an extreme case, two nodes that are many hops away from the root may be in range of each other, but still be out of sync. These nodes may be in sync with their parent nodes (parent meaning closer to the root), but be out of sync with each other. A distributed synchronization scheme fixes this problem. Another problem in traditional networks is that the entire network will crash if the root node goes down because without the root clock source, the clocks in network nodes will drift relative to one another (due to the inherent drift that occurs in node timing crystals) until they can no longer communicate. A distributed synchronization system eliminates the root node and also fixes this problem of a single point of failure in the network.

As such, the present network implements node synchronization by having each node periodically synchronize with each of its neighboring nodes. For example, a given node may receive synchronization timing signals from 3 neighboring nodes. The given node can then average the timing signals and adjust its own timing such that the given node has timing corresponding to the average. In one embodiment, each of the 3 received timing signals may be weighted prior to being averaged. The weighting of the timing signals can be based on a number of factors such as distance in the network between nodes, the specific hardware components found in a given node, the prior reliability of the node from which the timing signal is received, etc. As such, the nodes remain in sync with each other and there is no need for a root node. Also, because there is no root node, there will not be a root node crash that could bring down the network.

Traditional networks also use multicast broadcasts to distribute information (e.g., timing information, etc.) to all nodes in the network. However, as discussed above, in the present network, each node can have its own schedule such that different nodes listen for communications at different times. As such, a multicast broadcast will likely not be received by all nodes in the network. In addition, multicast broadcasts do not result in acknowledgement messages. As such, the broadcasting node does not know which other nodes in the network actually received the multicast message.

The present network uses schedule dependent unicast messages to ensure that all nodes in the network receive certain information. As discussed above, each node in the network is aware of the unique schedule of at least its immediate neighboring nodes. If a given node has information that is to be distributed to all nodes in the network, the given node distributes the message to its immediate neighbors as a unicast transmission based on the known listening schedule of the immediate neighbors. In turn, each of the immediate neighbors transmits the message as a unicast transmission to its immediate neighbors based on the known listening schedules of the neighbors, and so on until all nodes in the network receive the message.

In an illustrative embodiment, to help prevent a single node from receiving the same message multiple times, an algorithm can be put into place to instruct nodes with respect to which neighbors they should transmit. In one embodiment, each node in the network can categorize its neighboring nodes as incoming nodes or outgoing nodes, where 'incoming' does not necessarily connote that transmissions are received from that node and 'outgoing' does not necessarily connote that transmissions are sent to that node. In one embodiment, each node may have a maximum of 2 outgoing nodes as neighbors. In another embodiment, each node can transmit the unicast message to all of its incoming nodes and at most 1 of its outgoing nodes. This categorization can be visualized as a node edge diagram.

FIG. 5 illustrates a node edge diagram in accordance with an illustrative embodiment. The node edge diagram illustrated in FIG. 5 is a simplified diagram illustrating only 5 nodes for purposes of explanation. The nodes include node 500, node 505, node 510, node 515, and node 520. In an illustrative embodiment, each of the nodes illustrated in FIG. 5 can be configured to transmit unicast messages to each of its incoming nodes (i.e., neighboring nodes from which the arrows in FIG. 5 originate). Each of the nodes may also be configured to transmit to at most one of its outgoing nodes (i.e., neighboring nodes at which the arrows in FIG. 5 are pointing).

As an example, node 500 may have a message that is to be distributed to all nodes in the network. Node 500 has two neighboring nodes that are incoming nodes, node 515 and node 505. In the illustration of FIG. 5, node 500 does not have any outgoing nodes. As such, node 500 can transmit the message to node 515 and node 505. Node 505 can transmit to its only incoming node, which is node 510. Node 505 has a single outgoing node, which is node 500. However, node 505 can be configured to not transmit back to a node from which the message is received. Node 510 does not have any incoming nodes, but has node 505 and node 515 as outgoing nodes. Node 510 can be configured to not transmit the message back to node 505 because that is a node from which the message is received. Node 510 may also receive the message from node 515 because node 510 is an incoming node relative to node 515. If node 510 receives the message from node 515, node 510 would not transmit the same message back to node 515. As such, node 510 may not transmit the message. If node 510 does not receive the message from node 515, node 510 may transmit the message to node 515, because each node can be configured to transmit to at most one outgoing node. Node 515 would not transmit the message to node 500 because node 515 received the message from node 500. Node 515 would transmit the message to node 520, because node 520 is an incoming node relative to node 515. Node 515 would also transmit the message to node 510 unless node 515 receives the message from node 510 prior to such transmission. In alternative embodiments, different routing algorithms may be used.

In an illustrative embodiment, each unicast message that is sent in the network results in an acknowledgement of receipt message being generated by the receiving node and transmitted to the transmitting node. This is another advantage over multicast in that traditional multicast messages do not result in the generation of acknowledgements and the transmitting node has no way of knowing that all nodes actually received the multicast broadcast. In another illustrative embodiment, each node can include its schedule in each acknowledgement message that it sends. As such, neighboring nodes will have accurate knowledge of the schedules of neighboring nodes. The schedule, which as discussed above can be approximately 4 bytes, may be included in a header of the acknowledgement message. Alternatively, the schedule may be included elsewhere in the acknowledgement.

The acknowledgement messages can also include timing information such as a time template, the absolute slot number, etc. of the node transmitting the message. Transmission of the schedule and timing information in an acknowledgement message also allows new nodes to join the network. A new node that wants to join the network can listen for acknowledgement messages and overhear them. Upon overhearing one or more such acknowledgements, the new node can synchronize itself with the network and know the listening schedules of at least its neighboring nodes. The acknowledgement messages can further be used to help reduce conflicts in the network. For example, if a given node receives acknowledgements from 2 other nodes in the network and the 2 other nodes are on the same schedule, the given node may notify one or both of the 2 nodes that it/they should change their schedule to help avoid conflicts. The notification from the given node to the 1 or 2 other nodes can be included in an acknowledgment message or any other type of message. In one embodiment, a node may be configured to receive a threshold number of such notifications (e.g., 2, 3, 4, etc.) before actually changing its schedule.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   determining by a first node in a communications network, a predicted battery life of the first node;
   determining by the first node, a listening schedule to be used by the first node, the listening schedule of the first node is a selection of a time slot from within a frame length comprising a first number of time slots, the first number of time slots determined by the first node using at least the predicted battery life of the first node;
   determining by a second node in a communications network, a predicted battery life of the second node;
   determining by the second node, a listening schedule to be used by the second node, the listening schedule of the second node is a selection of a time slot from within a frame length comprising a second number of time slots, the second number of time slots determined by the second node using at least the predicted battery life of the second node;
   the first node receiving a synchronizing time signal from a plurality of other nodes, the first node averaging the received synchronizing time signals and adjusting its own timing signal to correspond to the averaged synchronizing time signal;
   the first node communicating its listening schedule to the second node;
   the second node broadcasting a message to the first node at a time corresponding to the listening schedule transmitted by the first node to the second node, the broadcast message comprising sensor information from the second node representing an evacuation condition and a location of the second node;
   the first node transmitting information from the message to a third node using a listening schedule of the third node; and
   repeating the transmission of the message to a plurality of nodes using the listening schedule for each of the plurality of nodes until the message is received by a decision node.

2. The method of claim 1, wherein each time slot is assigned a unique identifier that is known to all nodes in the communications network.

3. The method of claim 1, wherein prior to broadcasting the message, the second node determines if the first node is identified as a node to receive the broadcast message.

4. The method of claim 1 wherein frame lengths are a multiple of 2 time slots.

5. The method of claim 1, wherein the step of determining the location of the second node is performed by a portable computing device in communication with the second node, the portable computing device comprising a GPS receiver.

6. The method of claim 5, wherein the step of determining the location of the second node is performed during installation of the second node.

7. The method of claim 1, wherein the step of determining the location of the second node is done relative to a known building layout.

8. The method of claim 1, wherein the step of determining the location of the second node is done relative to at least one additional node.

9. The method of claim 1, further comprising communicating by the decision node, the evacuation condition and an evacuation route to an area occupant.

10. The method of claim 1, wherein the message comprises occupancy information.

11. The method of claim 10, wherein occupancy information is determined by an occupancy sensor comprising an audio detector.

12. The method of claim 10, wherein occupancy information is determined by an occupancy sensor comprising an infrared sensor.

13. The method of claim 10, wherein occupancy information is determined using previously identified occupancy patterns.

14. The method of claim 10, further comprising determining an evacuation route by performing the steps of reviewing a plurality of routes traversing from the area of the second node to an exit, the step of reviewing the plurality of routes comprises considering:
   the occupancy information;
   the evacuation condition;
   a magnitude of the evacuation condition;
   the location of the second node; and
   a layout of a structure in which the second node is located.

15. A communication network comprising:
a decision node, the decision node comprising a decision node memory and a processor in electronic communication with the decision node memory;
a plurality of sensor nodes, each sensor node comprising a sensor node memory and a processor in electronic communication the sensor node memory, the sensor node memory comprising instructions where the processors of each sensor node execute the instructions such that:
a predicted battery life of a first sensor node is determined;
the processor of the first sensor node determines a listening schedule to be used by the first sensor node, the listening schedule of the first sensor node is a selection of a time slot from within a frame length comprising a first number of time slots, the first number of time slots determined by the first sensor node using at least the predicted battery life of the first sensor node;
a predicted battery life of a second sensor node is determined;
the processor of the second sensor node determines a listening schedule to be used by the second sensor node, the listening schedule of the second sensor node is a selection of a time slot from within a frame length comprising a second number of time slots, the second number of time slots determined by the second sensor node using at least the predicted battery life of the second sensor node;
the first sensor node receives a synchronizing time signal from a plurality of other sensor nodes, the first sensor node averaging the received synchronizing time signals and adjusting its own timing signal to correspond to the averaged synchronizing time signal;
the first sensor node communicates its listening schedule to the second sensor node;
the second sensor node broadcasts a message to the first sensor node at a time corresponding to the listening schedule transmitted by the first sensor node to the second sensor node, the broadcast message comprising sensor information from the second sensor node representing an evacuation condition and a location of the second sensor node;
the first sensor node transmits information from the message to a third sensor node using a listening schedule of the third sensor node; and
the transmission of the message is repeated to a plurality of sensor nodes using the listening schedule for each of the plurality of sensor nodes until the message is received by the decision node.

16. The communication network of claim 15, wherein the decision node memory comprises instructions that when executed by the processor of the decision node cause the decision node to communicate the evacuation condition and an evacuation route to an area occupant.

17. The communication network of claim 15, wherein the message communicated to the first sensor node comprises occupancy information.

18. The communication network of claim 15, wherein the memory of the decision node comprises instructions that when executed by the processor of the decision node cause the decision node to determine the evacuation route by reviewing a plurality of routes traversing from the area of the second sensor node to an exit, reviewing the plurality of routes comprises considering:
the occupancy information;
the evacuation condition;
a magnitude of the evacuation condition;
the location of the second sensor node; and
a layout of a structure in which the second sensor node is located.

19. The communication network of claim 15, wherein each time slot is assigned a unique identifier that is known to all nodes in the communications network.

20. A communication network comprising:
a decision node, the decision node comprising a decision node memory and a processor in electronic communication with the decision node memory;
a plurality of sensor nodes, each sensor node comprising a sensor node memory and a processor in electronic communication the sensor node memory, the sensor node memory comprising instructions where the processors of each sensor node execute the instructions such that:
a predicted battery life of a first sensor node is determined;
the processor of the first node determines a listening schedule to be used by the first node, the listening schedule of the first node is a selection of a time slot from within a frame length comprising a first number of time slots, the first number of time slots determined by the first node using at least the predicted battery life of the first node;
a predicted battery life of a second sensor node is determined;
the processor of the second sensor node determines a listening schedule to be used by the second sensor node, the listening schedule of the second sensor node is a selection of a time slot from within a frame length comprising a second number of time slots, the second number of time slots determined by the second sensor node using at least the predicted battery life of the second sensor node;
the first sensor node receives a synchronizing time signal from a plurality of other nodes, the first sensor node averaging the received synchronizing time signals and adjusting its own timing signal to correspond to the averaged synchronizing time signal;
the sensor first node communicates its listening schedule to the second sensor node;
the second sensor node broadcasts a message to the first sensor node at a time corresponding to the listening schedule transmitted by the first sensor node to the second sensor node, the broadcast message comprising sensor information from the second node representing an evacuation condition and a location of the second node, the message further comprising occupancy information from the location of the second sensor node;
the first sensor node transmits information from the message to a third sensor node using a listening schedule of the third sensor node; and
the transmission of the message is repeated to a plurality of sensor nodes using the listening schedule for each of the plurality of sensor nodes until the message is received by the decision node;
the memory of the decision node comprises instructions that when executed by the processor of the decision node causes the decision node to determine the evacuation route by reviewing a plurality of routes traversing from the area of the second sensor node to an exit, reviewing the plurality of routes comprises considering:
the occupancy information;
the evacuation condition;
a magnitude of the evacuation condition;
the location of the second sensor node; and
a layout of a structure in which the second sensor node is located;
the memory of the decision node further comprising instructions that when executed by the processor of the decision node cause the processor to communicate the evacuation condition and an evacuation route to an area occupant.

* * * * *